United States Patent [19]

Sanders

[11] 4,083,942

[45] Apr. 11, 1978

[54] PROCESS FOR PRODUCING METAL BROMIDES

[75] Inventor: David C. Sanders, W. Lafayette, Ind.

[73] Assignee: Great Lakes Chemical Corporation, West Lafayette, Ind.

[21] Appl. No.: 773,851

[22] Filed: Mar. 3, 1977

[51] Int. Cl.² .................... C01F 11/34; C01D 3/10; C01B 31/20
[52] U.S. Cl. .................................. 423/497; 423/499; 423/437; 423/438; 260/542
[58] Field of Search ............... 423/499, 497, 437, 438

[56] References Cited

U.S. PATENT DOCUMENTS

| 1,863,375 | 6/1932 | Jones | 423/499 |
| 1,916,457 | 7/1933 | Behrman | 423/499 |

FOREIGN PATENT DOCUMENTS

| 285,915 | 9/1928 | United Kingdom | 423/497 |
| 138,232 | 7/1961 | U.S.S.R. | 423/499 |

Primary Examiner—Edward Stern

[57] ABSTRACT

Alkali and alkaline earth metal bromides may be prepared by reacting a basic compound of an alkali or alkaline earth metal with a reducing agent in the presence of water and thereafter adding thereto stepwise alternate incremental portions of bromine and the basic compound while maintaining the pH less than about 7.0.

14 Claims, No Drawings

PROCESS FOR PRODUCING METAL BROMIDES

BACKGROUND OF THE INVENTION

1. Field of the Invention

This invention relates to the preparation of metal bromides and more particularly to an improved process for preparing alkali and alkaline earth metal bromides by reacting a basic alkali or alkaline earth metal compound with bromine and a reducing agent in the presence of water.

2. Description of the Prior Art

The prior art has long taught the preparation of metallic bromides by reaction of a basic compound of an alkali or alkaline earth metal (e.g. sodium, potassium, calcium, and the like) with bromine in the presence of a reducing agent (e.g., urea, cyanamide, ammonium carbonate, ammonium bicarbonate, formamide, carbamates, ammonium cyanide and formic acid, oxalic acid, and their salts) which is converted to water and/or a gas.

More particularly, British specification No. 285,915 describes the preparation of calcium bromide by reacting a "non-acid" calcium compound (e.g. calcium oxide, hydroxide, and/or carbonate) with bromine in the presence of a reducing agent which is converted to gas and/or water. The reducing agent insures that substantially no bromates or hypobromites are formed as by-products. This patent describes several reaction sequences, among which are addition of the metal salt to a reaction medium comprising reducing agent, bromine, and water (Example I); addition of an aqueous solution of metal salt and reducing agent to an aqueous bromine reaction medium (Example II); and addition of bromine to a reaction medium comprising the metal salt, reducing agent, and water (Example III).

U.S. Pat. Nos. 1,863,375 and 2,007,758 broadly relate to a process for preparing metal bromides employing ammonia to retard the formation of bromate and hypobromite. The U.S. Pat. No. 1,863,375 relates to the recirculation of an aqueous ammonia containing metal salt solution through a tower absorber in which it is exposed to bromine vapor. The U.S. Pat. No. 2,007,758, relates to the same general process, but is specifically concerned with means for recovering the spent ammonia evolved from the reaction mixture.

U.S. Pat. No. 2,269,733 describes the reaction of an alkali or alkaline metal compound with bromine in the presence of one of a variety of reducing agents. Several alternative reaction sequences are described in the patent. For example, at page 3 col. 2, lines 48-53, there is described the simultaneous addition of bromine and metal salt to a mother liquor, with an excess of reducing agent preferably being employed (see, page 3, col. 1, lines 58-62).

Alternatively, the patent also describes a two step process in which ammonia and bromine are first reacted in the presence of mother liquor to form ammonium bromide, with the metal salt thereafter being added together with additional bromine (see page 4, col. 2 line 3 through page 5, col. 1, line 66).

The foregoing processes have not, however, been entirely satisfactory. A difficulty experienced with all of the described prior art processes has been the problem of foaming. Foaming due to carbon dioxide evolution cannot be adequately controlled at acceptable productivity levels by the use of conventional antifoaming agents.

The foaming problem has been aggravated with prior art processes because carbon dioxide is not evolved in quantities proportional to the added bromine. Thus, when bromine is added to a reaction medium comprising the basic metal compound, reducing agent and water, carbon dioxide evolution does not begin until about one-third of the bromine has been added, with all of the carbon dioxide being evolved during the completion of bromine addition.

Furthermore, when the prior art reaction sequence of adding bromine to a basic aqueous reaction medium to which the metal salt and reducing agent have first been added, violent reaction conditions have been experienced at the point when the pH shifts from the basic to acidic, thereby demonstrating that significant safety risks are involved with the process.

Accordingly, an object of this invention is to provide a new process for preparing metal bromides which avoids the disadvantages experienced with prior art processes.

A further object is to provide a process for producing metal bromides by reacting alkali or alkaline earth metal salt with bromine in the presence of a reducing agent and water in which carbon dioxide is generated in quantities proportional to that of the added bromine.

A further object is to provide a process of the character described which can be practiced without creating safety risks.

SUMMARY OF THE INVENTION

The foregoing and other objects, advantages, and features of this invention may be achieved with a process for preparing metal bromides comprising the steps of reacting a less than equivalent amount of a basic compound of an alkali or alkaline earth metal with formic acid in the presence of water to form a reaction mixture at a pH of less than about 7.0; thereafter adding stepwise alternate incremental portions of bromine and the basic compound while maintaining the pH less than about 7.0. Preferably, the reaction is carried out with a slight stoichiometric excess of reducing agent.

Following completion of bromine addition, the pH is preferably adjusted to the desired level. Where calcium bromide is being produced, the pH is desirably adjusted to at least about 7.0, preferably by adding lime to the reaction mixture. The product may be recovered by evaporation or it may be employed in solution form.

DETAILED DESCRIPTION OF THE PREFERRED EMBODIMENTS

In general, in accordance with this invention, a basic compound (e.g. an oxide, hydroxide, carbonate, or bicarbonate) of an alkali or alkaline earth metal is reacted with bromine in the presence of formic acid and water to provide the metal bromide. Where the metal compound is calcium hydroxide (lime), the overall reaction may be expressed as follows:

$$Ca(OH)_2 + HCOOH + Br_2 \rightarrow CaBr_2 + CO_2 + 2H_2O$$

In order to avoid disadvantages that have been encountered in prior art methods of carrying out this overall reaction, it is essential that the following reaction sequence be employed. A first portion comprising a less than equivalent amount of the basic metal compound is reacted with formic acid in the presence of water. Thereafter alternate incremental portions of bromine and the compound are added to the reaction while maintaining pH less than about 7.0. Upon completion, the reaction is preferably adjusted to at least about 7.0 if desired. The metal salt may be recovered in solid form by water removal, or it may be employed in aqueous solution form.

An especially preferred application of this process is in the preparation of concentrated aqueous calcium bromide solution for use in the oil industry as a completion, packer, work over and perforation fluid employed in abnormally pressured wells. The solution also has utility as a flotation fluid in ore refining operations.

The method of this invention may be employed in the preparation of bromides of alkaline metals and alkaline earth metals. Metals such as sodium, potassium, zinc, calcium, and the like may advantageously be employed, with calcium being preferred metal in accordance with this invention.

Basic compounds of these metals such as oxides, hydroxides, carbonates and bicarbonates are employed. Oxides and hydroxides are especially preferred by reason of their ready availability and utility in accordance with the practice of this process.

Where calcium is employed as the metal, it is preferred to use lime, $Ca(OH)_2$ as the basic compound employed.

In accordance with this invention, formic acid is used as a reducing agent. Alternatively, up to one-half of the formic acid may be replaced with the formate of the metal being treated without introducing unwanted ions into the reaction system. According, the term formic acid as used in the specification and claims should be understood to refer to the use of formates as well as formic acid per se.

The process is optimally carried out employing stoichiometrically equivalent amounts of the basic metal compound and bromine, with a slight (i.e. 3–5 percent) excess of formic acid being employed.

The reaction is not temperature dependent and may be carried out at substantially any convenient temperature. It has been found that it is desirable to employ a starting temperature of at least about 40° C because the metal formate slurry initially formed may have a viscosity too high for efficient stirring at lower temperatures.

A convenient reaction maximum temperature is about 100° C. While this is not an operative maximum from the stand point of the reaction, yield losses occurring as a result of bromine vapor losses at temperatures higher than about 100° C make it desirable that the reaction be allowed to occur at a temperature somewhat less than 100° C.

Substantially any stepwise alternative addition sequence may be employed for the bromine and metal salt so long as the critical pH limitations are met. Generally, at least three bromine addition steps and two metal salt additions are used.

A less than equivalent amount of the basic compound is initially added to the reducing agent such that all hydroxyl sites are converted to formate before bromine addition begins. The initial charge of basic compound may be taken as substantially any convenient portion of the total quantity to be employed for the batch such that the initial reaction mixture pH is less than about 7.0. For reasons of operating convenience and efficiency, it has been found that at least about 25% and preferably about 50% of the basic compound is initially reacted with the entire quantity of formic acid.

Where the process is employed in producing calcium bromide, it is desirable initially to react about half of the basic compound (e.g. lime) with formic acid to form calcium formate. Smaller initial lime increments may be employed, resulting in longer reaction times, unnecessary process steps and reduced efficiency; and larger initial quantities are therefore preferred.

Thereafter, bromine and the remaining basic compound are added in stepwise incremental quantities until the reaction has been completed, with the pH being kept less than 7.0, desirably less than about 4.0, and preferably less than about 2.5 at all times. It has been found that foaming due to carbon dioxide evolution is best controlled by operating at the lowest convenient pH. Thus, an especially preferred pH maximum during the alternative stepwise addition of bromine and basic compound is about 0.2. Where such a low maximum pH is employed, a relatively large number of alternate, incremental bromine and lime additions must be employed.

A variety of individual addition sequences may be employed in accordance with this invention, as demonstrated by the following examples.

EXAMPLE I

Water (65 grams) was charged into a reactor, and half of the lime (18.5 grams, 0.25 mole) was added to the water with agitation to form a slurry. Formic acid (25.6 grams, 0.525 mole) was than added at a rate such that the slurry temperature was maintained less than about 100° C. The pH of the calcium formate slurry was about 4.5–5.0.

Bromine and lime were then added in an alternative stepwise incremental manner as follows:
(1) Bromine (28 grams, 0.175 mole, 35% of the stoichiometric requirement) was then added subsurface at a rate such that bromine vapor did not appear in the reactor overhead;
(2) Thereafter, lime (7 grams, 19% of the total charge) was added until the pH rose to about 4.0;
(3) Bromine (28 grams, 35% of the total) was then added in the foregoing manner;
(4) Lime (16% of the charge 5.9 grams) was added until the pH rose to a level of about 4.0;
(5) Bromine (15% of the total, 12 grams) was added;
(6) The final 15% of the lime was added; and
(7) The final 10% of the bromine was added.

The resulting solution was a dark orange (indicating the presence of free bromine, HBr, and ferric bromide), and the pH thereof was adjusted by the addition of lime so as to provide a pH in the range of about 7–8.

Where the calcium bromide is to be recovered in solution form, the specific gravity is checked and adjusted by addition or evaporation of water as required. The solution may be filtered but is otherwise obtained in satisfactory purity.

EXAMPLES II – V

The following specific examples demonstrate other reaction addition sequences employed in accordance with this invention. In all cases, the general technique of Example I was followed, with only the relative amounts in the stepwise incremental additions of bromine and lime being altered as shown in the following Table. In each case, the final composition pH was adjusted by lime addition to the range of about 7–8.

The addition sequence of Example V is preferred in accordance with this invention (i.e., incremental bromine steps of about 35%, 35%, 20%, and 10% alternated with lime charges of approximately 19%, 16% and 15%).

TABLE

|  | Ex. II 100% Formic Acid 50% Lime | Ex. III 100% Formic Acid 50% Lime | Ex. IV 100% Formic Acid 50% Lime | Ex. V 100% Formic Acid 50% Lime |
|---|---|---|---|---|
| Initial Charge |  |  |  |  |
| Bromine Charge | 50% | 40% | 35% | 35% |
| Lime Charge | 25% | 25% | 19% | 19% |
| Bromine Charge | 50% | 40% | 35% | 35% |
| Lime Charge | 25% | 25% | 19% | 16% |
| Bromine Charge | — | 20% | 20% | 20% |
| Lime Charge | — | — | 12% | 15% |
| Bromine Charge | — | — | 10% | 10% |

The process exemplified by Examples I-V could be modified by initially reacting smaller quantities of the lime with the formic acid. However, effect of such a sequence would be to lengthen the overall reaction and to acquire additional unnecessary reaction addition steps. It is therefore preferred in accordance with this invention to employ at least 25% and preferably about 50% of the lime in the initial reactor charge.

The rate at which bromine is added is limited only by the practical operating maximum temperature selected and the heat transfer capabilities of the reactor and reaction medium. In addition, the capability of the system to remove evolved $CO_2$ and limitations on system pressure also constrain the rate of bromide addition.

Foaming may occur due to $CO_2$ evolution with foaming becoming a realistic problem at most only during the later phases of the reaction. It has been found that the addition of conventional antifoaming material such as Dow Antifoam-A and the like may be advantageously employed as additional additives. Alternatively and preferably, it has been found that by controlling the reaction pH within careful limits, foaming is not a significant problem. By maintaining the pH less than about 4.0, preferably less than about 2.5 and especially advantageously less than 0.2 during the entire stepwise alternative addition sequence, excessive foaming is avoided.

The following example demonstrates the disadvantages of other prior art reaction sequences not employing the stepwise alternative sequential addition of reactants in accordance with this invention.

EXAMPLE VI

A 1000 gallon reactor was charged with water (in an amount calculated to produce the desired calcium bromide solution density), lime (one equivalent), and formic acid (1.05 equivalent). Bromine (1.0 equivalent) was added to the basic (pH approximately 10.5) slurry. Carbon dioxide evolution began after one-third of the bromine had been added and continued until the reaction was complete. Final solution pH was adjusted by lime addition.

Significant foaming problems occured when the reaction was carried out and could not at acceptable reaction productivities be adequately handled in all cases by the addition antifoam materials such as Dow Antifoam-A or the like.

Moreover, during a run conducted in the foregoing manner, a violent reaction occured which lifted the reactor from the floor, breaking the attached glass and piping. While applicant is unable to state with specificity the precise cause of the problem, it is believed to relate to the build up of calcium hypobromite at the low initial reaction temperature followed by rapid decomposition thereof as the reactor warms. Conditions in the reactor are believed to have been further aggravated at the point where the pH changed from basic to acid since hypobromite is much less stable in acid than in basic solution.

By following the sequence of steps of this invention namely the stepwise incremental alternative addition of bromine and lime, the reaction may be safely and efficiently carried out, with yields in excess of 90% based on the starting materials being achieved.

While this invention has been specifically described with respect to the production of calcium bromide from lime, other starting materials (e.g. calcium carbonate and calcium oxide) may be employed in the same fashion, as can other basic compounds of alkali and alkaline earth metals such as sodium, potassium, lithium, zinc, barium, magnesium and the like to produce their coresponding bromides.

I claim:

1. A stable process for preparing metal bromides without excessive foaming comprising the steps of:
   reacting a less than equivalent amount of a basic compound of a metal selected from the group consisting of alkali and alkaline earth metals with formic acid in the presence of water to form a reaction mixture at a pH of less than 7.0 and in which the hydroxyl sites of the compound have been converted to formates;
   thereafter adding stepwise alternate incremental portions of bromine and the basic compound while maintaining the pH less than 7.0 until the reaction is complete in order to control evolution of carbon dioxide.

2. A process, as claimed in claim 1, wherein the metal is calcium and the compound is calcium hydroxide.

3. A process, as claimed in claim 2, and further comprising the step of adjusting the pH of the final reaction mixture to at least about 7.0 in order to neutralize the reaction mixture.

4. A process, as claimed in claim 1, and further comprising the step of recovering the metal bromide from the aqueous reaction mixture.

5. A process, as claimed in claim 1, wherein at least three bromine additions and at least two basic compound additions are made.

6. A stable process for preparing aqueous calcium bromide without excessive foaming comprising the steps of:
   reacting a less than equivalent amount of a basic compound selected from the group consisting of calcium hydroxide, calcium oxide and calcium carbonate with formic acid in the presence of water to form a reaction mixture at a pH less than 7.0 and in which hydroxyl sites of the compound have been converted to formate;
   thereafter adding stepwise, alternate incremental portions of bromine and the basic compound while maintaining the pH less than 7.0 until the reaction is complete in order to control evolution of carbon dioxide.

7. A process, as claimed in claim 6, wherein the pH of the reaction is maintained at a level of less than about 4.0 during the stepwise alternate incremental addition of bromine and the compound.

8. A process, as claimed in claim 7, wherein the pH is maintained at a level of less than about 2.5.

9. A process, as claimed in claim 6, wherein the basic compound is calcium hydroxide.

10. A process, as claimed in claim 6, wherein the reaction is conducted at a temperature in the range of about 40°–100° C.

11. A process, as claimed in claim 6, wherein the less than equivalent amount is up to about 50% of the equivalent amount of the basic compound.

12. A process, as claimed in claim 6, wherein the at least three bromine additions and at least two basic compound additions are made.

13. A stable process for preparing calcium bromide without excessive foaming comprising the steps of:
   reacting about one-half equivalent of lime with a slight excess of formic acid in the presence of water to form a reaction mixture at a pH of less than 7.0 thereafter adding to the reaction mixture stepwise alternate incremental portions of bromine and lime in accordance with the sequence:
   about 0.35 equivalent bromine
   about 0.19 equivalent lime
   about 0.35 equivalent bromine
   about 0.16 equivalent lime
   about 0.20 equivalent bromine
   about 0.15 equivalent lime
   about 0.10 equivalent bromine;
   in order to control evolution of carbon dioxide; and
   adjusting the pH of the final reaction mixture to a level of at least 7.0 in order to neutralize the reaction mixture.

14. A process, as claimed in claim 13, and further comprising the step of recovering the calcium bromide from the reaction mixture.

* * * * *